United States Patent
Cao et al.

(10) Patent No.: US 10,034,177 B2
(45) Date of Patent: Jul. 24, 2018

(54) USER EQUIPMENT, BASE STATION, AND CARRIER USING METHOD

(71) Applicant: HUAWEI TECHNOLOGIES CO., LTD., Shenzhen, Guangdong (CN)

(72) Inventors: Zhenzhen Cao, Beijing (CN); Jie Ma, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/265,034

(22) Filed: Sep. 14, 2016

(65) Prior Publication Data

US 2017/0006476 A1    Jan. 5, 2017

Related U.S. Application Data

(63) Continuation of application No. PCT/CN2014/073693, filed on Mar. 19, 2014.

(51) Int. Cl.
*H04L 5/00*  (2006.01)
*H04W 16/14*  (2009.01)
(Continued)

(52) U.S. Cl.
CPC .......... *H04W 16/14* (2013.01); *H04L 5/0057* (2013.01); *H04W 72/042* (2013.01);
(Continued)

(58) Field of Classification Search
CPC .............. H04W 16/14; H04W 72/042; H04W 72/0453; H04L 5/0057
See application file for complete search history.

(56) References Cited

U.S. PATENT DOCUMENTS

2010/0060433 A1*  3/2010  Karabinis .............. G01D 21/00
                                                340/10.3
2011/0243048 A1* 10/2011  Wang ................... H04L 5/0051
                                                370/311
(Continued)

FOREIGN PATENT DOCUMENTS

CN        102843696        12/2012
CN        103299565         9/2013
(Continued)

OTHER PUBLICATIONS

International Search Report, dated Dec. 22, 2014, in International Application No. PCT/CN2014/073693 (5 pp.).
(Continued)

*Primary Examiner* — Qun Shen
(74) *Attorney, Agent, or Firm* — Staas & Halsey LLP

(57) ABSTRACT

A carrier using method includes: receiving, by the user equipment, configuration information that is of a secondary component carrier and sent by the base station, and configuring the secondary component carrier according to the configuration information; after receiving a first activation command sent by the base station, activating the configured secondary component carrier to obtain an activated secondary component carrier, and controlling to enable a radio frequency RF module of the user equipment; receiving use right control information that is of the activated secondary component carrier and sent by the base station, and determining an available time of the activated secondary component carrier according to the use right control information; performing an operation related to the activated secondary component carrier within the available time; and stopping performing the operation related to the activated secondary component carrier after the available time is reached.

15 Claims, 8 Drawing Sheets

(51) Int. Cl.
*H04W 72/04* (2009.01)
*H04W 88/02* (2009.01)
*H04W 88/08* (2009.01)

(52) U.S. Cl.
CPC ........ *H04W 72/0453* (2013.01); *H04W 88/02* (2013.01); *H04W 88/08* (2013.01)

(56) References Cited

U.S. PATENT DOCUMENTS

| | | | | |
|---|---|---|---|---|
| 2011/0249635 | A1* | 10/2011 | Chen | H04W 76/38 370/329 |
| 2012/0058797 | A1 | 3/2012 | Gaal et al. | |
| 2012/0176926 | A1 | 7/2012 | Jang et al. | |
| 2012/0263087 | A1* | 10/2012 | Aiba | H04B 1/7087 370/311 |
| 2013/0039202 | A1* | 2/2013 | Feuersanger | H04L 5/001 370/252 |
| 2013/0343261 | A1* | 12/2013 | Gonsa | H04B 7/2606 370/315 |
| 2014/0219237 | A1* | 8/2014 | Charbit | H04W 72/044 370/330 |
| 2015/0163805 | A1* | 6/2015 | Cattoni | H04W 72/0453 370/329 |
| 2016/0150423 | A1 | 5/2016 | Jeong et al. | |

FOREIGN PATENT DOCUMENTS

| | | |
|---|---|---|
| WO | WO2010/143924 | 12/2010 |
| WO | WO2012/162875 | 12/2012 |
| WO | WO2013116662 | 8/2013 |
| WO | WO2013167557 | 11/2013 |

OTHER PUBLICATIONS

Extended European Search Report, dated Apr. 13, 2017, in European Application No. 14886651.0 (9 pp.).
*Discussion about CC Activation and Deactivation*, 3GPP TSG-RAN WG2 Meeting #69bis, Beijing, China, Apr. $12^{th}$-$16^{th}$ 2010, R2-I02427, pp. 1-3.
*3rd Generation Partnership Project; Technical Specification Group Radio Access Network; Evolved Universal Terrestrial Radio Access (E-UTRA); Medium Access Control (MAC) protocol specification (Release 12)*, 3GPP TS 36.321 V12.0.0 (Dec. 2013),. pp. 1-57.
*3rd Generation Partnership Project; Technical Specification Group Radio Access Network; Evolved Universal Terrestrial Radio Access (E-UTRA); Radio Resource Control (RRC); Protocol specification (Release 12)*, 3GPP TS 36.331 V12.0.0 (Dec. 2013), pp. 1-349.
International Search Report dated Dec. 22, 2014 in corresponding International Application No. PCT/CN2014/073693.
Notice of Reasons for Rejection, dated Nov. 21, 2017, in Japanese Application No. 2016557967 (6 pp.).

* cited by examiner

USER EQUIPMENT, BASE STATION, AND CARRIER USING METHOD

CROSS-REFERENCE TO RELATED APPLICATION

This application is a continuation of International Application No. PCT/CN2014/073693, filed on Mar. 19, 2014, the disclosure of which is hereby incorporated by reference in its entirety.

TECHNICAL FIELD

The present invention relates to the field of communications technologies, and in particular, to user equipment, a base station, and a carrier using method.

BACKGROUND

With rapid development of wireless communications technologies, available spectrum resources are under increasing strain. Spectrum management is a spectrum planning method created for effectively using wireless spectrums. In current spectrum management, spectrum resources are classified into two types. One type is a licensed spectrum allocated to a fixed licensed user (for example, a user that uses a network service provided by a mobile network operator). To avoid excessive mutual interference between users, only the licensed user and a device that is of the licensed user and that conforms to specifications are allowed to access the licensed spectrum. The other type is an unlicensed spectrum allocated to an unlicensed user (for example, a home user). A device that meets specifications and a standard can access and use the unlicensed spectrum. A Wireless Fidelity (Wireless Fidelity, WiFi for short) device mainly works on the unlicensed spectrum. Currently, frequency bands of unlicensed spectrums in China mainly include 2.4-2.4835 GHz, 5.725-5.850 GHz, and the like.

However, different mobile network operators raise increasing requirements for radio spectrums, and licensed spectrums fixedly allocated to the mobile network operators no longer meet data transmission requirements of the mobile network operators. How to use an existing spectrum more effectively to meet requirements of the mobile network operators for spectrum resources has become a problem to be urgently resolved.

SUMMARY

Embodiments of the present invention provide user equipment, a base station, and a carrier using method, so as to achieve an objective of further improving utilization of existing carrier resources.

To resolve the foregoing technical problem, technical solutions adopted by the present invention are as follows:

According to a first aspect, the present invention provides user equipment, including:

a carrier configuration module, configured to: receive configuration information that is of a secondary component carrier and sent by a base station, and configure the secondary component carrier according to the configuration information, where the secondary component carrier is a carrier resource in an unlicensed frequency band or a shared frequency band, and the shared frequency band is a frequency band granted to at least two operators for sharing;

a first control module, configured to: after receiving a first activation command sent by the base station, activate the secondary component carrier configured by the carrier configuration module to obtain an activated secondary component carrier, and control to enable a radio frequency RF module of the user equipment;

a time determining module, configured to: receive use right control information that is of the activated secondary component carrier and sent by the base station, and determine an available time of the activated secondary component carrier according to the use right control information; and a second control module, configured to: perform an operation related to the activated secondary component carrier within the available time determined by the time determining module, and stop performing the operation related to the activated secondary component carrier after the available time determined by the time determining module is reached.

In a first possible implementation manner of the first aspect, the time determining module includes:

a first information receiving submodule, configured to receive a second activation command and a second deactivation command sent by the base station in sequence; and a first time determining submodule, configured to determine an interval time between receiving the second activation command and receiving the second deactivation command by the first information receiving submodule as the available time of the activated secondary component carrier.

In a second possible implementation manner of the first aspect, the time determining module includes:

a second information receiving submodule, configured to receive a third activation command that carries an activation time and that is sent by the base station; and a second time determining submodule, configured to determine the activation time as the available time of the activated secondary component carrier.

In a third possible implementation manner of the first aspect, the time determining module includes:

a third information receiving submodule, configured to receive a synchronization signal sent by the base station at a specified frequency by using the activated secondary component carrier; and a third time determining submodule, configured to determine a period during which the third information receiving submodule can receive the synchronization signal as the available time of the activated secondary component carrier.

With reference to the first aspect or the first, second, or third possible implementation manner of the first aspect, in a fourth possible implementation manner, the operation related to the activated secondary component carrier includes: detecting a physical downlink control channel PDCCH related to the activated secondary component carrier, reporting related information, and receiving downlink data sent by the base station by using the activated secondary component carrier, where the related information includes one or more of a channel quality indicator CQI, a precoding matrix index PMI, a rank indicator RI, and a precoding type indicator PTI; and the user equipment further includes:

a timer start module, configured to: after the time determining module receives the use right control information that is of the activated secondary component carrier and sent by the base station, start a deactivation timer of the user equipment if the deactivation timer is in an unstarted state, so that the deactivation timer counts time according to a preset time length; or if a deactivation timer of the user equipment is in a suspended state, make the deactivation timer continue to count time from a suspended moment according to a preset time length;

a timer restart module, configured to: restart the deactivation timer each time the second control module receives the downlink data, so that the deactivation timer counts time again according to the preset time length;

a timer suspending module, configured to: if timing by the deactivation timer does not expire and the available time determined by the time determining module ends, suspend the deactivation timer; and a third control module, configured to: if timing by the deactivation timer expires, deactivate the activated secondary component carrier, stop performing the operation related to the activated secondary component carrier, and disable the RF module.

With reference to the first aspect or the first, second, or third possible implementation manner of the first aspect, in a fifth possible implementation manner, the user equipment further includes:

a fourth control module, configured to: after receiving a first deactivation command sent by the base station, deactivate the activated secondary component carrier, stop performing the operation related to the activated secondary component carrier, and disable the RF module.

According to a second aspect, the present invention provides a base station, including:

a configuration sending module, configured to send configuration information of a secondary component carrier to user equipment, so that the user equipment configures the secondary component carrier according to the configuration information, where the secondary component carrier is a carrier resource in an unlicensed frequency band or a shared frequency band, and the shared frequency band is a frequency band granted to at least two operators for sharing;

a first sending module, configured to send a first activation command to the user equipment, so that after receiving the first activation command, the user equipment activates the configured secondary component carrier to obtain an activated secondary component carrier, and controls to enable a radio frequency RF module of the user equipment; and a second sending module, configured to send use right control information of the activated secondary component carrier to the user equipment, so that the user equipment determines an available time of the activated secondary component carrier according to the use right control information, performs an operation related to the activated secondary component carrier within the available time, and stops performing the operation related to the activated secondary component carrier after the available time is reached.

In a first possible implementation manner of the second aspect, the second sending module is specifically configured to send a second activation command and a second deactivation command to the user equipment in sequence, so that the user equipment determines an interval time between receiving the second activation command and receiving the second deactivation command as the available time of the activated secondary component carrier.

In a second possible implementation manner of the second aspect, the second sending module is specifically configured to send, to the user equipment, a third activation command that carries an activation time, so that the user equipment determines the activation time as the available time of the activated secondary component carrier.

In a third possible implementation manner of the second aspect, the second sending module is specifically configured to send a synchronization signal to the user equipment at a specified frequency by using the activated secondary component carrier, so that the user equipment determines a time period during which the user equipment can receive the synchronization signal as the available time of the activated secondary component carrier.

With reference to the second aspect or the first, second, or third possible implementation manner of the second aspect, in a fourth possible implementation manner, the base station further includes:

a third sending module, configured to send a first deactivation command to the user equipment, so that after receiving the first deactivation command, the user equipment deactivates the activated secondary component carrier, stops performing the operation related to the activated secondary component carrier, and disables the RF module.

According to a third aspect, the present invention provides a carrier using method, including:

receiving, by user equipment, configuration information that is of a secondary component carrier and sent by a base station, and configuring the secondary component carrier according to the configuration information, where the secondary component carrier is a carrier resource in an unlicensed frequency band or a shared frequency band, and the shared frequency band is a frequency band granted to at least two operators for sharing;

after receiving a first activation command sent by the base station, activating the configured secondary component carrier to obtain an activated secondary component carrier, and controlling to enable a radio frequency RF module of the user equipment;

receiving use right control information that is of the activated secondary component carrier and sent by the base station, and determining an available time of the activated secondary component carrier according to the use right control information; and performing an operation related to the activated secondary component carrier within the available time, and stopping performing the operation related to the activated secondary component carrier after the available time is reached.

In a first possible implementation manner of the third aspect, the receiving use right control information that is of the activated secondary component carrier and sent by the base station, and determining an available time of the activated secondary component carrier according to the use right control information includes:

receiving a second activation command and a second deactivation command sent by the base station in sequence; and determining an interval time between receiving the second activation command and receiving the second deactivation command as the available time of the activated secondary component carrier.

In a second possible implementation manner of the third aspect, the receiving use right control information that is of the activated secondary component carrier and sent by the base station, and determining an available time of the activated secondary component carrier according to the use right control information includes:

receiving a third activation command that carries an activation time and that is sent by the base station; and determining the activation time as the available time of the activated secondary component carrier.

In a third possible implementation manner of the third aspect, the receiving use right control information that is of the activated secondary component carrier and sent by the base station, and determining an available time of the activated secondary component carrier according to the use right control information includes:

receiving a synchronization signal sent by the base station at a specified frequency by using the activated secondary component carrier; and determining a period during which the synchronization signal can be received as the available time of the activated secondary component carrier.

With reference to the third aspect or the first, second, or third possible implementation manner of the third aspect, in a fourth possible implementation manner, the operation related to the activated secondary component carrier includes: detecting a physical downlink control channel PDCCH related to the activated secondary component carrier, reporting related information, and receiving downlink data sent by the base station by using the activated secondary component carrier, where the related information includes one or more of a channel quality indicator CQI, a precoding matrix index PMI, a rank indicator RI, and a precoding type indicator PTI, and the method further includes:

after receiving the use right control information that is of the activated secondary component carrier and sent by the base station, starting a deactivation timer of the user equipment if the deactivation timer is in an unstarted state, so that the deactivation timer counts time according to a preset time length; or if a deactivation timer of the user equipment is in a suspended state, making the deactivation timer continue to count time from a suspended moment according to a preset time length;

restarting the deactivation timer each time the downlink data is received, so that the deactivation timer counts time again according to the preset time length; and if timing by the deactivation timer does not expire and the available time ends, suspending the deactivation timer; or if timing by the deactivation timer expires, deactivating the activated secondary component carrier, stopping performing the operation related to the activated secondary component carrier, and disabling the RF module.

With reference to the third aspect or the first, second, or third possible implementation manner of the third aspect, in a fifth possible implementation manner, the method further includes:

after receiving a first deactivation command sent by the base station, deactivating the activated secondary component carrier, stopping performing the operation related to the activated secondary component carrier, and disabling the RF module.

According to a fourth aspect, the present invention provides a carrier using method, including:

sending, by a base station, configuration information of a secondary component carrier to user equipment, so that the user equipment configures the secondary component carrier according to the configuration information, where the secondary component carrier is a carrier resource in an unlicensed frequency band or a shared frequency band, and the shared frequency band is a frequency band granted to at least two operators for sharing;

sending a first activation command to the user equipment, so that after receiving the first activation command, the user equipment activates the configured secondary component carrier to obtain an activated secondary component carrier, and controls to enable a radio frequency RF module of the user equipment; and sending use right control information of the activated secondary component carrier to the user equipment, so that the user equipment determines an available time of the activated secondary component carrier according to the use right control information, performs an operation related to the activated secondary component carrier within the available time, and stops performing the operation related to the activated secondary component carrier after the available time is reached.

In a first possible implementation manner of the fourth aspect, the sending use right control information of the activated secondary component carrier to the user equipment, so that the user equipment determines an available time of the activated secondary component carrier according to the use right control information includes:

sending a second activation command and a second deactivation command to the user equipment in sequence, so that the user equipment determines an interval time between receiving the second activation command and receiving the second deactivation command as the available time of the activated secondary component carrier.

In a second possible implementation manner of the fourth aspect, the sending use right control information of the activated secondary component carrier to the user equipment, so that the user equipment determines an available time of the activated secondary component carrier according to the use right control information includes:

sending, to the user equipment, a third activation command that carries an activation time, so that the user equipment determines the activation time as the available time of the activated secondary component carrier.

In a third possible implementation manner of the fourth aspect, the sending use right control information of the activated secondary component carrier to the user equipment, so that the user equipment determines an available time of the activated secondary component carrier according to the use right control information includes:

sending a synchronization signal to the user equipment at a specified frequency by using the activated secondary component carrier, so that the user equipment determines a time period during which the user equipment can receive the synchronization signal as the available time of the activated secondary component carrier.

With reference to the fourth aspect or the first, second, or third possible implementation manner of the fourth aspect, in a fourth possible implementation manner, the method further includes:

sending a first deactivation command to the user equipment, so that after receiving the first deactivation command, the user equipment deactivates the activated secondary component carrier, stops performing the operation related to the activated secondary component carrier, and disables the RF module.

According to the user equipment, the base station, and the carrier using method provided in the embodiments of the present invention, first, the user equipment configures a secondary component carrier in an unlicensed frequency band or a shared frequency band; when the base station needs to perform data transmission by using the configured secondary component carrier, the secondary component carrier configured by the user equipment is first activated and a radio frequency module of the user equipment is enabled; when needing to perform data transmission by using the activated secondary component carrier, the base station delivers use right control information of the activated secondary component carrier, so that the user equipment determines an available time of the activated secondary component carrier according to the use right control information, and the user equipment performs an operation related to the activated secondary component carrier within the available time. It may be learned that in the embodiments of the present invention, data transmission may be further implemented by using the secondary component carrier in the unlicensed frequency band or the shared frequency band, and a requirement of a mobile network operator or a mobile technology for spectrum resources is further met. In addition, based on temporal discontinuity of a use right of the activated secondary component carrier, in the embodiments of the present invention, only when the base station has or is to have the use right of the activated secondary component carrier, the user equipment performs the operation related to the activated secondary component carrier. In this way, the available time of the activated secondary component carrier may be fully used for data scheduling, and not only carrier utilization efficiency is improved, but also unnecessary power consumption and resource consumption are further reduced for the user equipment.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
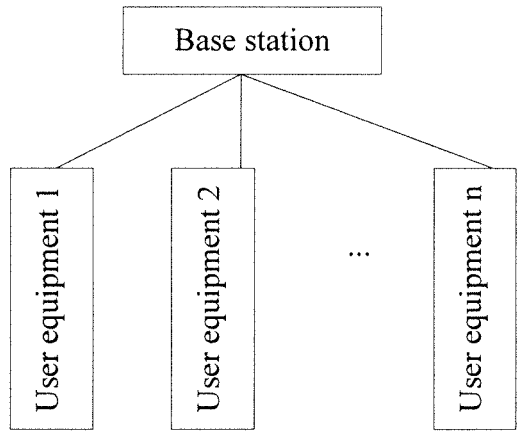
FIG. 1 is an architecture diagram of a system formed by user equipment and a base station according to an embodiment of the present invention.

User equipment, a base station, and a carrier using method provided in the embodiments of the present invention are applicable to an architecture diagram shown in FIG. 1 of a system formed by user equipment and a base station. The system includes a base station and one or more user equipment in a coverage area of the base station. When the base station communicates with the user equipment in the coverage area, signal transmission between the base station and the user equipment needs to be implemented by using a carrier. In the embodiments of the present invention, when the signal transmission is implemented, an unlicensed spectrum or a shared spectrum between different operators may be further effectively used, so as to further meet a requirement of a mobile operator for spectrum resources. The following specifically describes the embodiments of the present invention.

Figure 2:
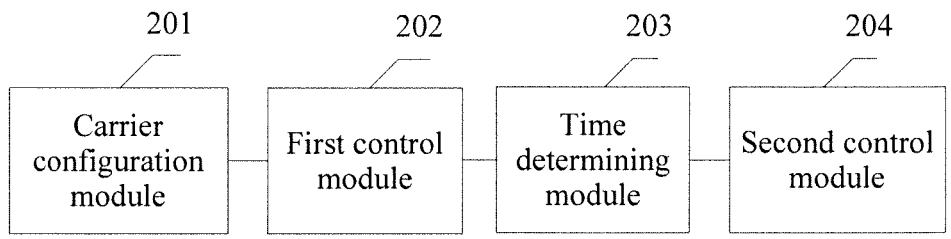
FIG. 2 is a schematic structural diagram of user equipment according to an embodiment of the present invention.

Referring to FIG. 2, FIG. 2 is a schematic structural diagram of user equipment according to an embodiment of the present invention, and the user equipment includes:

A carrier configuration module 201, configured to: receive configuration information that is of a secondary component carrier and sent by a base station, and configure the secondary component carrier according to the configuration information, where the secondary component carrier is a carrier resource in an unlicensed frequency band or a shared frequency band, and the shared frequency band is a frequency band granted to at least two operators for sharing.

A first control module 202, configured to: after receiving a first activation command sent by the base station, activate the secondary component carrier configured by the carrier configuration module 201 to obtain an activated secondary component carrier, and control to enable a radio frequency (Radio Frequency, RF for short) module of the user equipment, but skip performing an operation related to the activated secondary component carrier.

In this embodiment, multiple carriers may be configured for each cell, the base station (evolved Node B, eNB for short) may use one or more carriers of a cell in which the base station is located, but a carrier that can be used by the user equipment (User Equipment, UE for short) is a carrier configured by an eNB. The configured carrier is further classified into an activated carrier (the activated carrier further includes an activated primary component carrier and an activated secondary component carrier, and the eNB may send the configuration information to the UE by using an activated primary component carrier or an activated secondary component carrier that serves the UE) and a deactivated carrier. The UE can perform data transmission on only the activated carrier, and does not perform any data transmission on the deactivated carrier. When the eNB needs to perform data transmission by using the configured secondary component carrier, the eNB may send the first activation command to the UE by using a primary component carrier or any activated secondary component carrier that serves the UE.

In this embodiment, in the configuration information that is of the secondary component carrier and is received by the carrier configuration module 201, it may be further identified that the secondary component carrier is an unlicensed spectrum or a shared spectrum. After receiving the first activation command, the first control module 202 detects whether the configured secondary component carrier is identified to be an unlicensed spectrum or a shared spectrum, if yes, activates the configured secondary component carrier to obtain the activated secondary component carrier, and enables the corresponding RF module, so as to prepare for data transmission performed between the UE and the eNB by using the activated secondary component carrier.

A time determining module 203, configured to: receive use right control information that is of the activated secondary component carrier and sent by the base station, and determine an available time of the activated secondary component carrier according to the use right control information.

A second control module 204, configured to: perform the operation related to the activated secondary component carrier within the available time determined by the time determining module 203, and stop performing the operation related to the activated secondary component carrier after the available time determined by the time determining module 203 is reached.

In the first control module 202 and the second control module 204 of this embodiment, the operation related to the activated secondary component carrier includes: detecting a physical downlink control channel (Physical Downlink Control Channel, PDCCH for short) related to the activated secondary component carrier, reporting related information, and receiving downlink data sent by the base station by using the activated secondary component carrier. The related information includes one or more of a channel quality indicator (Channel Quality Indicator, CQI for short), a precoding matrix index (Precoding Matrix Index, PMI for short), a rank indicator (Rank Indicator, RI for short), and a precoding type indicator (Precoding Type Indicator, PTI for short). The detecting the PDCCH related to the activated secondary component carrier includes: PDCCH detection on the activated secondary component carrier, and PDCCH detection on another carrier performed when data on the activated secondary component carrier is scheduled by using the another carrier.

Figure 3:
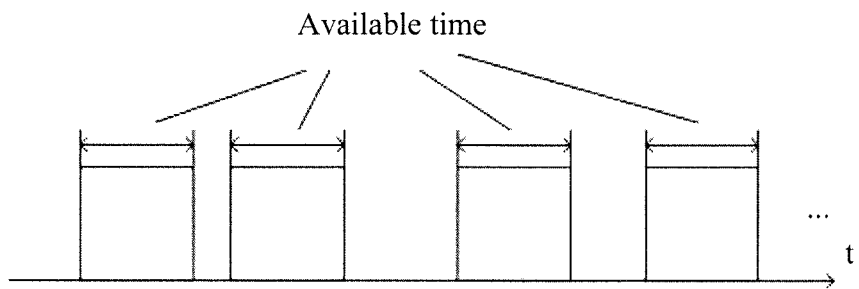
FIG. 3 is a schematic diagram of an available time of an activated secondary component carrier according to an embodiment of the present invention.

Referring to FIG. 3, FIG. 3 is a schematic diagram of an available time of an activated secondary component carrier. When the activated secondary component carrier is an unlicensed spectrum, the UE needs to share the unlicensed spectrum with other communications equipment such as WiFi that works on the unlicensed spectrum. When the activated secondary component carrier is a licensed shared spectrum, the UE needs to share the shared spectrum with other communications equipment that works on the shared spectrum. Therefore, the eNB needs to obtain a use right of the activated secondary component carrier in a competition manner or a non-competition manner, and time of a use right acquired each time is limited, for example, an available time of the unlicensed spectrum is approximately 10 ms. Based on discontinuity of the available time, when the use right of the activated secondary component carrier is not acquired, if at the same time of enabling the RF module, the first control module 202 detects the PDCCH related to the activated secondary component carrier and feeds back the related information, unnecessary energy is consumed for detecting the PDCCH, and unnecessary resources are consumed for feeding back the related information. Therefore, the second control module 204 in this embodiment of the present invention detects the PDCCH and feeds back the related information only within the available time of the activated secondary component carrier, which may save energy and resources on a UE side. In addition, because the available time of the activated secondary component carrier is relatively short, the activated secondary component carrier may be fully used within a valid time for data transmission, which further improves carrier resources utilization efficiency.

In the foregoing embodiment, the time determining module 203 determines the available time of the activated secondary component carrier in the following three implementation manners:

Manner 1:

The use right of the activated secondary component carrier is discrete on a timeline. Based on this limitation, the second control module 204 may make, according to a second activation command and a second deactivation command delivered by the base station, the UE perform the operation related to the activated secondary component carrier within a time interval (that is, the available time of the activated secondary component carrier) between the two commands. Specific implementation is as follows:

When the eNB has or is to have the use right of the activated secondary component carrier, the eNB may send the second activation command to the UE by using a primary component carrier or any secondary component carrier that has been activated, so that the UE detects the PDCCH related to the activated secondary component carrier, reports the related information, and implements data transmission between the eNB and the UE by using the activated secondary component carrier. When the eNB loses or is to lose the use right of the activated secondary component carrier, the eNB may send the second deactivation command to the UE, so that the UE stops detecting the PDCCH related to the activated secondary component carrier and reporting the related information, and no longer implements data transmission between the eNB and the UE by using the activated secondary component carrier.

Based on the foregoing content, the time determining module 203 specifically includes:

a first information receiving submodule, configured to receive the second activation command and the second deactivation command sent by the base station in sequence, where the second activation command may be a command sent by the base station when the base station has the use right of the activated secondary component carrier or before the base station has the use right of the activated secondary component carrier, and the second deactivation command may be a command sent by the base station when the base station loses the use right of the activated secondary component carrier or before the base station loses the use right of the activated secondary component carrier; and a first time determining submodule, configured to determine an interval time between receiving the second activation command and receiving the second deactivation command by the first information receiving submodule as the available time of the activated secondary component carrier.

Manner 2:

The use right of the activated secondary component carrier is discrete on a timeline. Based on this limitation, the second control module 204 may make, according to a third activation command that carries an activation time and that is delivered by the base station, the UE perform the operation related to the activated secondary component carrier within the activation time (that is, the available time of the activated secondary component carrier). Specific implementation is as follows:

When the eNB has or is to have the use right of the activated secondary component carrier, the eNB may send, to the UE by using a primary component carrier or any secondary component carrier that has been activated, the third activation command that carries the activation time, so that the UE detects the PDCCH related to the activated secondary component carrier and reports the related information within the activation time, and implements data transmission between the eNB and the UE within the activation time by using the activated secondary component carrier. After the activation time is reached, it indicates that the eNB has lost the use right of the activated secondary component carrier, and in this case, the UE stops detecting the PDCCH related to the activated secondary component carrier and reporting the related information, and no longer implements data transmission between the eNB and the UE by using the activated secondary component carrier.

Based on the foregoing content, the time determining module 203 specifically includes:

a second information receiving submodule, configured to receive the third activation command that carries the activation time and that is sent by the base station, where the third activation command may be a command sent by the base station when the base station has the use right of the activated secondary component carrier or before the base station has the use right of the activated secondary component carrier; and a second time determining submodule, configured to determine the activation time as the available time of the activated secondary component carrier.

Manner 3:

The use right of the activated secondary component carrier is discrete on a timeline. Based on this limitation, the second control module 204 may continually detect a synchronization signal delivered by the base station, so that the UE performs the operation related to the activated secondary component carrier within a period (that is, the available time of the activated secondary component carrier) during which the UE can receive the synchronization signal. Specific implementation is as follows:

When having the use right of the activated secondary component carrier, the eNB may continually send the synchronization signal to the UE by using the activated secondary component carrier, so that the UE detects the PDCCH related to the activated secondary component carrier and reports the related information within the period during which the UE can detect the synchronization signal, and implements data transmission between the eNB and the UE within the period by using the activated secondary component carrier. When losing the use right of the activated secondary component carrier, the eNB no longer sends the synchronization signal to the UE, and when the UE cannot detect the synchronization signal, the UE stops detecting the PDCCH related to the activated secondary component carrier and reporting the related information, and no longer implements data transmission between the eNB and the UE by using the activated secondary component carrier.

Based on the foregoing content, the time determining module 203 specifically includes:

a third information receiving submodule, configured to receive the synchronization signal sent by the base station at a specified frequency by using the activated secondary component carrier, where the synchronization signal is a signal sent by the base station when the base station has the use right of the activated secondary component carrier; and a third time determining submodule, configured to determine the period during which the third information receiving submodule can receive the synchronization signal as the available time of the activated secondary component carrier.

Further, after the first control module 202 on the UE side receives the first activation command, if it is obtained, by means of determining, that the activated secondary component carrier is an unlicensed spectrum or a shared spectrum, in this case, a deactivation timer is not started, that is, time of the deactivation timer is set to infinite or the deactivation timer is in a closed state. After the UE receives the second activation command, the third activation command, or the synchronization signal sent by the eNB, to determine that the activated secondary component carrier is available, if the deactivation timer is in an unstarted state, the UE starts the deactivation timer, and the deactivation timer counts time according to a preset time length; or if the deactivation timer is in a suspended state, the UE makes the deactivation timer continue to count time, and a timing moment of the timer is the last suspending time. In addition, within the available time of the activated secondary component carrier, the UE may repeatedly receive downlink data sent by the eNB, and the UE restarts the deactivation timer each time the downlink data is received, and counts time according to the preset time length. In a timing process of the deactivation timer of the UE, if the deactivation timer expires, the UE deactivates the activated secondary component carrier, stops detecting the PDCCH related to the activated secondary component carrier and reporting the related information, and disables the RF module; if a case in which timing by the deactivation timer expires does not occur, on the basis of the foregoing three implementation manners of the time determining module 203, the UE may control the deactivation timer according to one of the following indications of the eNB, which are specifically:

(1) After the UE receives the second deactivation command sent by the eNB, the UE suspends the deactivation timer and keeps a current timing moment of the deactivation timer.

(2) After the UE receives a third deactivation command that carries the activation time and that is sent by the eNB, when timing by the activation time expires, the UE suspends the deactivation timer and keeps a current timing moment of the deactivation timer.

(3) When the UE cannot detect, on the activated secondary component carrier, the synchronization signal sent by the eNB, the UE suspends the deactivation timer and keeps a current timing moment of the deactivation timer.

Based on the foregoing content, the foregoing user equipment further includes:

a timer start module, configured to: after the time determining module 203 receives the use right control information that is of the activated secondary component carrier and sent by the base station, start the deactivation timer if the deactivation timer of the user equipment is in an unstarted state, so that the deactivation timer counts time according to the preset time length; or if the deactivation timer of the user equipment is in a suspended state, make the deactivation timer continue to count time from a suspended moment according to the preset time length;

a timer restart module, configured to: restart the deactivation timer each time the second control module 204 receives the downlink data, so that the deactivation timer counts time again according to the preset time length;

a timer suspending module, configured to: if timing by the deactivation timer does not expire and the available time determined by the time determining module 203 ends, suspend the deactivation timer; and a third control module, configured to: if the deactivation timer expires, deactivate the activated secondary component carrier, stop performing the operation related to the activated secondary component carrier, and disable the RF module.

Further, in the foregoing embodiment, when the base station does not need to perform data transmission by using the activated secondary component carrier, the base station may deliver a first deactivation command, so that the user equipment stops all settings or operations related to the activated secondary component carrier. Therefore, the user equipment may further include: a fourth control module, configured to: after receiving the first deactivation command sent by the base station, deactivate the activated secondary component carrier, stop performing the operation related to the activated secondary component carrier, and disable the RF module.

It may be understood that the base station in this embodiment of the present invention may be a base station device that uses any technology such as Long Term Evolution (Long Term Evolution, LTE) or a Universal Mobile Telecommunications System (Universal Mobile Telecommunications System, UMTS); the activation command in this embodiment of the present invention may be signaling at a protocol layer such as the radio resource control (Radio Resource Control, RRC for short) protocol, Media Access Control (Media Access Control, MAC for short), or a physical layer (physical layer, PHY).

In hardware implementation, the foregoing modules may be built in or independent of a processor of the user equipment in a hardware form, or may be stored in the user equipment in a software form, for example, in a memory of the user equipment, so that the processor invokes and performs an operation corresponding to each of the foregoing modules. The processor may be a central processing unit (CPU), a microprocessor, a single-chip microcomputer, or the like.

Figure 4:
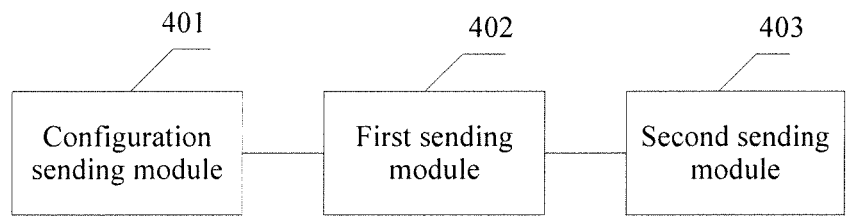
FIG. 4 is a schematic structural diagram of a base station according to an embodiment of the present invention.

Referring to FIG. 4, FIG. 4 is a schematic structural diagram of a base station according to Embodiment 2 of the present invention, and the base station includes:

a configuration sending module 401, configured to send configuration information of a secondary component carrier to user equipment, so that the user equipment configures the secondary component carrier according to the configuration information, where the secondary component carrier is a carrier resource in an unlicensed frequency band or a shared frequency band, and the shared frequency band is a frequency band granted to at least two operators for sharing;

a first sending module 402, configured to send a first activation command to the user equipment, so that after receiving the first activation command, the user equipment activates the configured secondary component carrier to obtain an activated secondary component carrier, and controls to enable a radio frequency RF module of the user equipment; and a second sending module 403, configured to send use right control information of the activated secondary component carrier to the user equipment, so that the user equipment determines an available time of the activated secondary component carrier according to the use right control information, performs an operation related to the activated secondary component carrier within the available time, and stops performing the operation related to the activated secondary component carrier after the available time is reached.

In this embodiment of the present invention, the second sending module 403 is specifically configured to send a second activation command and a second deactivation command to the user equipment in sequence, so that the user equipment determines an interval time between receiving the second activation command and receiving the second deactivation command as the available time of the activated secondary component carrier, where the second activation command may be a command sent by the base station when the base station has a use right of the activated secondary component carrier or before the base station has a use right of the activated secondary component carrier, and the second deactivation command may be a command sent by the base station when the base station loses the use right of the activated secondary component carrier or before the base station loses the use right of the activated secondary component carrier.

Alternatively, the second sending module 403 is specifically configured to send, to the user equipment, a third activation command that carries an activation time, so that the user equipment determines the activation time as the available time of the activated secondary component carrier, where the third activation command may be a command sent by the base station when the base station has a use right of the activated secondary component carrier or before the base station has a use right of the activated secondary component carrier.

Alternatively, the second sending module 403 is specifically configured to send a synchronization signal to the user equipment at a specified frequency by using the activated secondary component carrier, so that the user equipment determines a time period during which the user equipment can receive the synchronization signal as the available time of the activated secondary component carrier, where the synchronization signal is a signal sent by the base station when the base station has a use right of the activated secondary component carrier.

Further, in this embodiment of the present invention, the base station further includes:

a third sending module, configured to send a first deactivation command to the user equipment, so that after receiving the first deactivation command, the user equipment deactivates the activated secondary component carrier, stops performing the operation related to the activated secondary component carrier, and disables the RF module.

It should be noted that for parts related to description of the base station, refer to the foregoing embodiment of the user equipment, and details are not described herein.

In hardware implementation, the foregoing modules may be built in or independent of a processor of the base station in a hardware form, or may be stored in the base station in a software form, for example, in a memory of the base station, so that the processor invokes and performs an operation corresponding to each of the foregoing modules. The processor may be a central processing unit (CPU), a microprocessor, a single-chip microcomputer, or the like.

Further, the embodiments of the present invention further separately provide composition of user equipment 100 and a base station 200, which may include a transmitter, a receiver, a processor, at least one network interface or another communications interface, a memory, and at least one communications bus configured to implement connection and communication between the apparatuses. The transmitter is configured to send data, the receiver is configured to receive data, and the processor is configured to execute an executable module stored in the memory, for example, a computer program. The memory may include a high-speed random access memory (RAM: Random Access Memory), and may further include a non-volatile memory (non-volatile memory), for example, at least one magnetic disk memory. The at least one network interface (which may be wired or wireless) may implement communication and connection between a system gateway and at least one another network element over the Internet, a wide area network, a local area network, a metropolitan area network, or the like.

Figure 5:
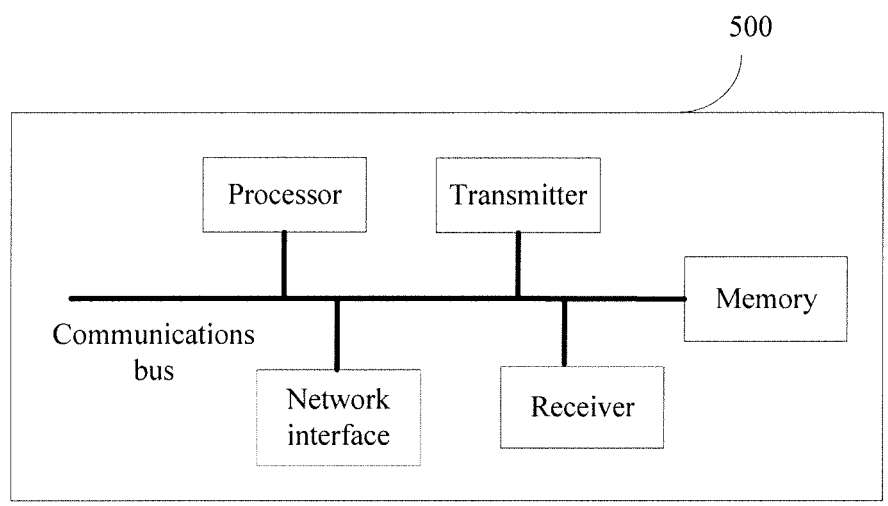
FIG. 5 is a schematic diagram of composition of user equipment according to an embodiment of the present invention.

Referring to a schematic diagram of composition of user equipment 500 shown in FIG. 5, in some implementation manners, a memory stores a program instruction, and the program instruction may be executed by a processor, a transmitter, and a receiver.

The receiver is configured to receive configuration information that is of a secondary component carrier and sent by a base station, where the secondary component carrier is a carrier resource in an unlicensed frequency band or a shared frequency band, and the shared frequency band is a frequency band granted to at least two operators for sharing.

The processor is configured to configure the secondary component carrier according to the configuration information received by the receiver.

The receiver is configured to receive use right control information that is of an activated secondary component carrier and sent by the base station.

The processor is configured to: determine an available time of the activated secondary component carrier according to the use right control information, perform an operation related to the activated secondary component carrier within the available time, and stop performing the operation related to the activated secondary component carrier after the available time is reached.

In some embodiments of the present invention, the receiver and the processor are further configured to perform the following steps:

when the receiver is configured to receive a second activation command and a second deactivation command sent by the base station in sequence, the processor is configured to determine an interval time between receiving the second activation command and receiving the second deactivation command as the available time of the activated secondary component carrier;

when the receiver is configured to receive a third activation command that carries an activation time and that is sent by the base station, the processor is configured to determine the activation time as the available time of the activated secondary component carrier; or when the receiver is configured to receive a synchronization signal sent by the base station at a specified frequency by using the activated secondary component carrier, the processor is configured to determine a period during which the synchronization signal can be received as the available time of the activated secondary component carrier.

In some embodiments of the present invention, the operation related to the activated secondary component carrier includes: detecting a physical downlink control channel (PDCCH) related to the activated secondary component carrier, reporting related information, and receiving downlink data sent by the base station by using the activated secondary component carrier, where the related information includes one or more of a channel quality indicator (CQI), a precoding matrix index (PMI), a rank indicator (RI), and a precoding type indicator (PTI). The processor is further configured to perform the following steps:

after the receiver receives the use right control information that is of the activated secondary component carrier and sent by the base station, start a deactivation timer of the user equipment if the deactivation timer is in an unstarted state, so that the deactivation timer counts time according to a preset time length; or if a deactivation timer of the user equipment is in a suspended state, make the deactivation timer continue to count time from a suspended moment according to a preset time length;

restart the deactivation timer each time the receiver receives the downlink data, so that the deactivation timer counts time again according to the preset time length; and if timing by the deactivation timer does not expire and the available time ends, suspend the deactivation timer; or if timing by the deactivation timer expires, deactivate the activated secondary component carrier, stop performing the operation related to the activated secondary component carrier, and disable the RF module.

In some embodiments of the present invention, the processor is further configured to perform the following steps:

after the receiver receives a first deactivation command sent by the base station, deactivate the activated secondary component carrier, stop performing the operation related to the activated secondary component carrier, and disable the RF module.

Figure 6:
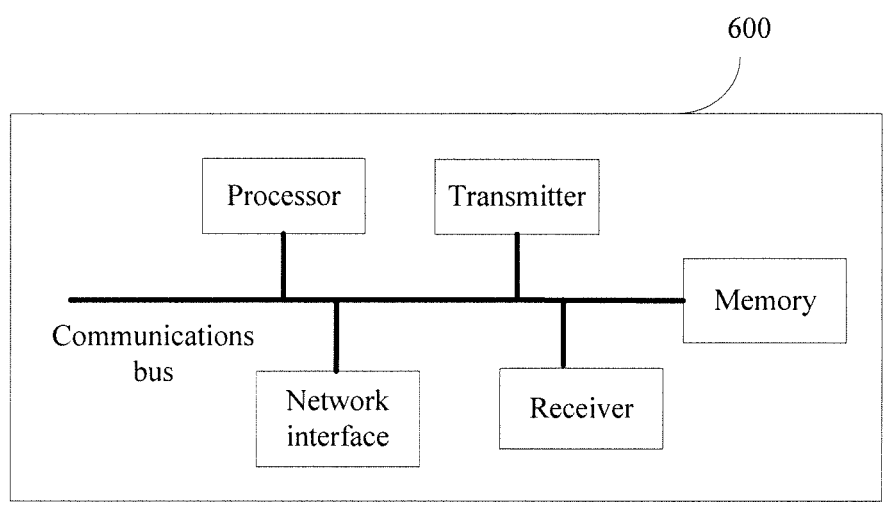
FIG. 6 is a schematic diagram of composition of a base station according to an embodiment of the present invention.

Referring to a schematic diagram of composition of a base station 600 shown in FIG. 6, in some implementation manners, a memory stores a program instruction, and the program instruction may be executed by a processor, a transmitter, and a receiver.

The transmitter is configured to: send configuration information of a secondary component carrier to user equipment, so that the user equipment configures the secondary component carrier according to the configuration information, where the secondary component carrier is a carrier resource in an unlicensed frequency band or a shared frequency band, and the shared frequency band is a frequency band granted to at least two operators for sharing; send a first activation command to the user equipment, so that after receiving the first activation command, the user equipment activates the configured secondary component carrier to obtain an activated secondary component carrier, and controls to enable a radio frequency RF module of the user equipment; and send use right control information of the activated secondary component carrier to the user equipment, so that the user equipment determines an available time of the activated secondary component carrier according to the use right control information, performs an operation related to the activated secondary component carrier within the available time, and stops performing the operation related to the activated secondary component carrier after the available time is reached.

In some embodiments of the present invention, the transmitter is further configured to perform the following steps:

send a second activation command and a second deactivation command to the user equipment in sequence, so that the user equipment determines an interval time between receiving the second activation command and receiving the second deactivation command as the available time of the activated secondary component carrier;

send, to the user equipment, a third activation command that carries an activation time, so that the user equipment determines the activation time as the available time of the activated secondary component carrier; or send a synchronization signal to the user equipment at a specified frequency by using the activated secondary component carrier, so that the user equipment determines a time period during which the user equipment can receive the synchronization signal as the available time of the activated secondary component carrier.

In some embodiments of the present invention, the transmitter is further configured to perform the following steps:

send a first deactivation command to the user equipment, so that after receiving the first deactivation command, the user equipment deactivates the activated secondary component carrier, stops performing the operation related to the activated secondary component carrier, and disables the RF module.

According to the user equipment and the base station provided in this embodiment of the present invention, first, the user equipment configures a secondary component carrier in an unlicensed frequency band or a shared frequency band; when the base station needs to perform data transmission by using the configured secondary component carrier, the secondary component carrier configured by the user equipment is first activated and a radio frequency module of the user equipment is enabled; when needing to perform data transmission by using the activated secondary component carrier, the base station delivers use right control information of the activated secondary component carrier, so that the user equipment determines an available time of the activated secondary component carrier according to the use right control information, and the user equipment performs an operation related to the activated secondary component carrier within the available time. It may be learned that in this embodiment of the present invention, data transmission may be further implemented by using the secondary component carrier in the unlicensed frequency band or the shared frequency band, and a requirement of a mobile network operator or a mobile technology for spectrum resources is further met. In addition, based on temporal discontinuity of a use right of the activated secondary component carrier, in this embodiment of the present invention, only when the base station has or is to have the use right of the activated secondary component carrier, the user equipment performs the operation related to the activated secondary component carrier. In this way, the available time of the activated secondary component carrier may be fully used for data scheduling, and not only carrier utilization efficiency is improved, but also unnecessary power consumption and resource consumption are further reduced for the user equipment.

The foregoing describes user equipment and a base station in the embodiments of the present invention. The following describes a carrier using method in the embodiments of the present invention. For relevant parts, refer to the foregoing embodiments of the user equipment and the base station.

Figure 7:
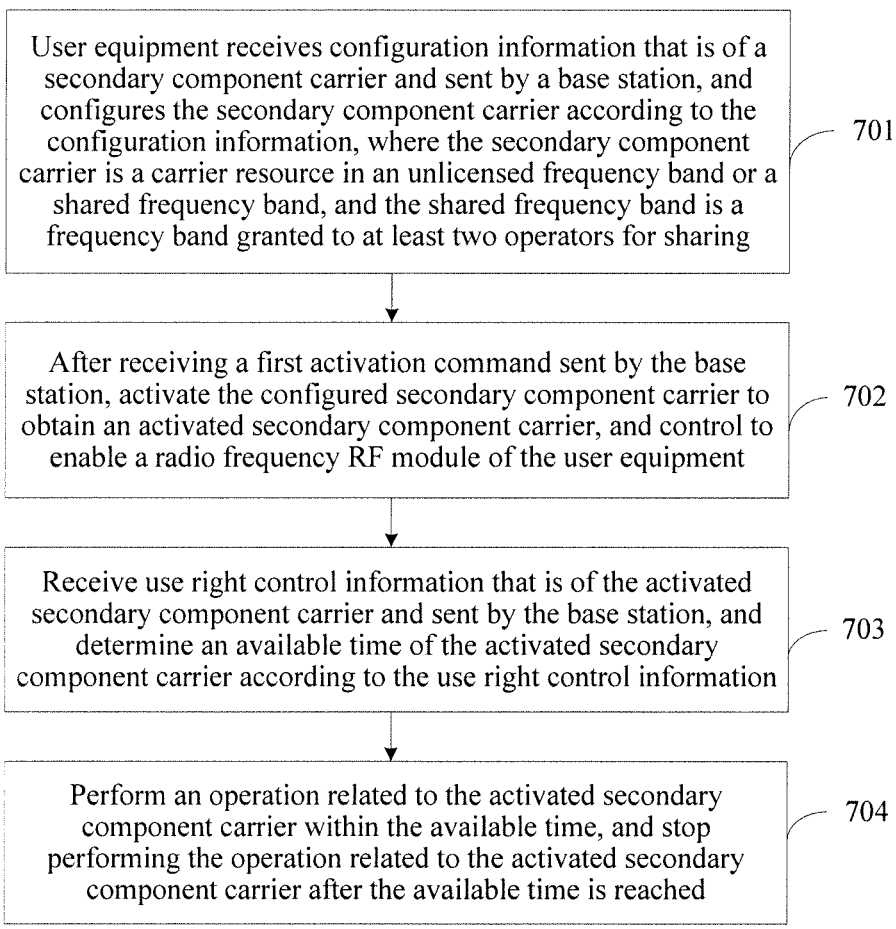
FIG. 7 is a schematic flowchart of a carrier using method according to an embodiment of the present invention.

Referring to FIG. 7, FIG. 7 is a schematic flowchart of a carrier using method according to an embodiment of the present invention, and the method includes:

Step 701: User equipment receives configuration information that is of a secondary component carrier and sent by a base station, and configures the secondary component carrier according to the configuration information, where the secondary component carrier is a carrier resource in an unlicensed frequency band or a shared frequency band, and the shared frequency band is a frequency band granted to at least two operators for sharing.

Step 702: After receiving a first activation command sent by the base station, the user equipment activates the configured secondary component carrier to obtain an activated secondary component carrier, and controls to enable a radio frequency RF module of the user equipment.

In the configuration information sent by the eNB, it may be identified that the secondary component carrier is an unlicensed spectrum or a shared spectrum. After receiving the first activation command, the UE detects whether the configured secondary component carrier is identified to be an unlicensed spectrum or a shared spectrum, if yes, activates the configured secondary component carrier to obtain the activated secondary component carrier, and enables the corresponding RF module, so as to prepare for data transmission performed between the UE and the eNB by using the activated secondary component carrier.

Step 703: The user equipment receives use right control information that is of the activated secondary component carrier and sent by the base station, and determines an available time of the activated secondary component carrier according to the use right control information.

In this embodiment, step 703 may be implemented in one of the following three manners:

Manner 1: A second activation command and a second deactivation command sent by the base station in sequence are received, and an interval time between receiving the second activation command and receiving the second deactivation command is determined as the available time of the activated secondary component carrier.

Manner 2: A third activation command that carries an activation time and that is sent by the base station is received, and the activation time is determined as the available time of the activated secondary component carrier.

Manner 3: A synchronization signal that is sent by the base station at a specified frequency by using the activated secondary component carrier is received, and a period during which the synchronization signal can be received is determined as the available time of the activated secondary component carrier.

Step 704: The user equipment performs an operation related to the activated secondary component carrier within the available time, and the user equipment stops performing the operation related to the activated secondary component carrier after the available time is reached.

In this embodiment, the operation related to the activated secondary component carrier includes: detecting a physical downlink control channel (PDCCH) related to the activated secondary component carrier, reporting related information, and receiving downlink data sent by the base station by using the activated secondary component carrier, where the related information includes one or more of a channel quality indicator (CQI), a precoding matrix index (PMI), a rank indicator (RI), and a precoding type indicator (PTI).

Further, this method embodiment further includes:

after receiving the use right control information that is of the activated secondary component carrier and sent by the base station, starting a deactivation timer of the user equipment if the deactivation timer is in an unstarted state, so that the deactivation timer counts time according to a preset time length; or if a deactivation timer of the user equipment is in a suspended state, making the deactivation timer continue to count time from a suspended moment according to a preset time length;

restarting the deactivation timer each time the user equipment receives the downlink data, so that the deactivation timer counts time again according to the preset time length; and if timing by the deactivation timer does not expire and the available time ends, suspending the deactivation timer; or if timing by the deactivation timer expires and does not reach the available time, deactivating the activated secondary component carrier, stopping performing the operation related to the activated secondary component carrier, and disabling the RF module.

Further, this method embodiment further includes:

after receiving a first deactivation command sent by the base station, deactivating, by the user equipment, the activated secondary component carrier, stopping performing the operation related to the activated secondary component carrier, and disabling the RF module.

Figure 8:
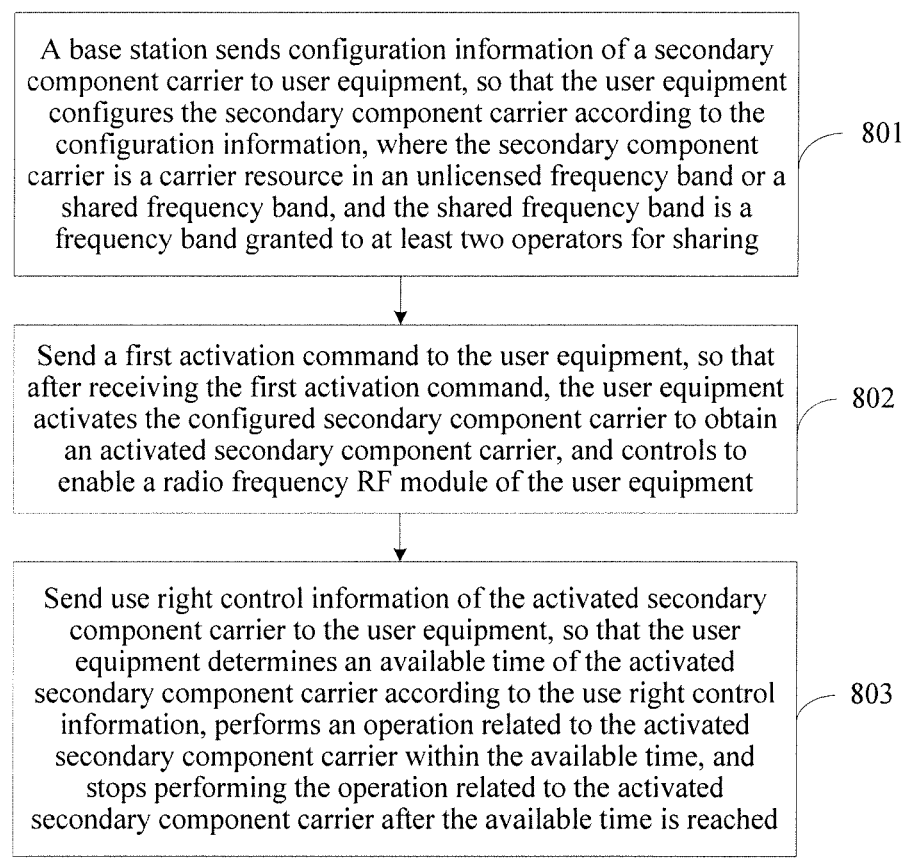
FIG. 8 is another schematic flowchart of a carrier using method according to an embodiment of the present invention.

Referring to FIG. 8, FIG. 8 is another schematic flowchart of a carrier using method according to an embodiment of the present invention, and the method includes:

Step 801: A base station sends configuration information of a secondary component carrier to user equipment, so that the user equipment configures the secondary component carrier according to the configuration information, where the secondary component carrier is a carrier resource in an unlicensed frequency band or a shared frequency band, and the shared frequency band is a frequency band granted to at least two operators for sharing.

Step 802: The base station sends a first activation command to the user equipment, so that after receiving the first activation command, the user equipment activates the configured secondary component carrier to obtain an activated secondary component carrier, and controls to enable a radio frequency RF module of the user equipment.

Step 803: The base station sends use right control information of the activated secondary component carrier to the user equipment, so that the user equipment determines an available time of the activated secondary component carrier according to the use right control information, performs an operation related to the activated secondary component carrier within the available time, and stops performing the operation related to the activated secondary component carrier after the available time is reached.

In this embodiment, step 603 may be implemented in one of the following three manners:

Manner 1: The base station sends a second activation command and a second deactivation command to the user equipment in sequence, so that the user equipment determines an interval time between receiving the second activation command and receiving the second deactivation command as the available time of the activated secondary component carrier.

Manner 2: The base station sends, to the user equipment, a third activation command that carries an activation time, so that the user equipment determines the activation time as the available time of the activated secondary component carrier.

Manner 3: The base station sends a synchronization signal to the user equipment at a specified frequency by using the activated secondary component carrier, so that the user equipment determines a time period during which the user equipment can receive the synchronization signal as the available time of the activated secondary component carrier.

Further, this method embodiment further includes:

sending, by the base station, a first deactivation command to the user equipment, so that after receiving the first deactivation command, the user equipment deactivates the activated secondary component carrier, stops performing the operation related to the activated secondary component carrier, and disables the RF module.

To facilitate understanding of the embodiments of the present invention, the following describes the carrier using method of the present invention with reference to signaling interworking diagrams.

Figure 9:
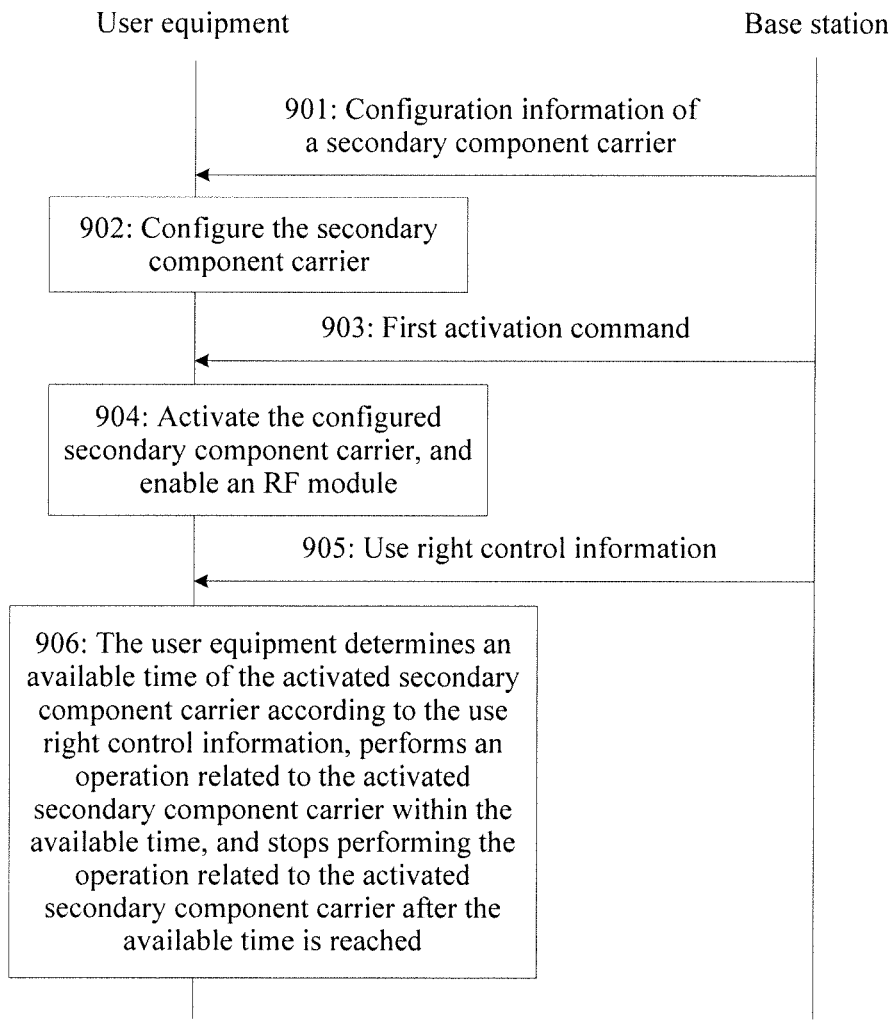
FIG. 9 is a signaling interworking diagram of a carrier using method according to an embodiment of the present invention.

Referring to FIG. 9, FIG. 9 is a signaling interworking diagram of a carrier using method according to an embodiment of the present invention, and the method includes:

Step 901: A base station sends configuration information of a secondary component carrier to user equipment, where the secondary component carrier is a carrier resource in an unlicensed frequency band or a shared frequency band, and the shared frequency band is a frequency band granted to at least two operators for sharing.

Step 902: The user equipment configures the secondary component carrier according to the configuration information.

Step 903: The base station sends a first activation command to the user equipment.

Step 904: After receiving the first activation command sent by the base station, the user equipment activates the configured secondary component carrier to obtain an activated secondary component carrier, and controls to enable a radio frequency RF module of the user equipment.

Step 905: The base station sends use right control information of the activated secondary component carrier to the user equipment.

Step 906: The user equipment determines an available time of the activated secondary component carrier according to the use right control information, performs an operation related to the activated secondary component carrier within the available time, and stops performing the operation related to the activated secondary component carrier after the available time is reached.

The operation related to the activated secondary component carrier includes: detecting a physical downlink control channel (PDCCH) related to the activated secondary component carrier, reporting related information, and receiving downlink data sent by the base station by using the activated secondary component carrier, where the related information includes one or more of a channel quality indicator (CQI), a precoding matrix index (PMI), a rank indicator (RI), and a precoding type indicator (PTI).

Figure 10:
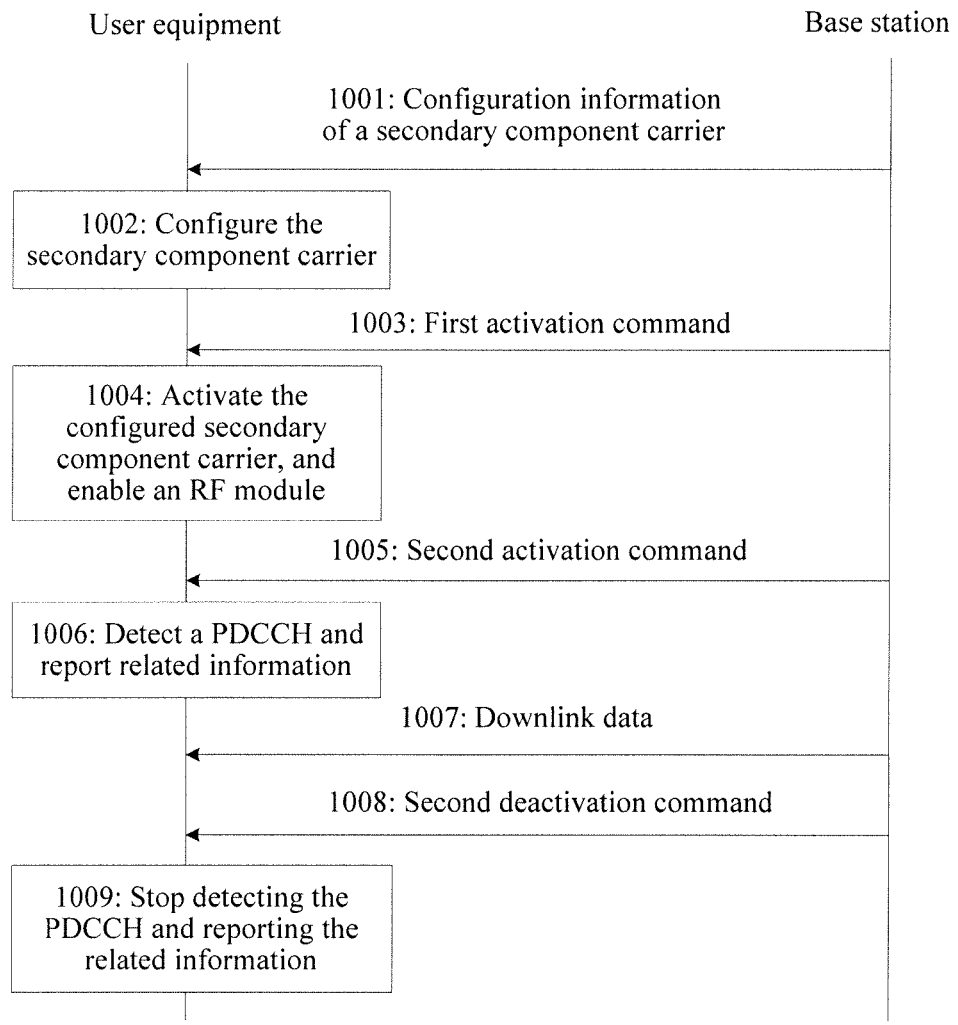
FIG. 10 is another signaling interworking diagram of a carrier using method according to an embodiment of the present invention.

In this embodiment, the foregoing carrier using method may be implemented according to different use right control information, and the following separately provides descriptions:

First: In this embodiment, the permission control information includes a first activation command and a first deactivation command. Referring to FIG. 10, FIG. 10 is another signaling interworking diagram of a carrier using method according to an embodiment of the present invention, and the method specifically includes:

Step 1001: A base station sends configuration information of a secondary component carrier to user equipment, where the secondary component carrier is a carrier resource in an unlicensed frequency band or a shared frequency band, and the shared frequency band is a frequency band granted to at least two operators for sharing.

Step 1002: The user equipment configures the secondary component carrier according to the configuration information.

Step 1003: The base station sends the first activation command to the user equipment.

Step 1004: The user equipment activates the configured secondary component carrier to obtain an activated secondary component carrier, and controls to enable a radio frequency RF module of the user equipment.

Step 1005: When the base station has a use right of the activated secondary component carrier or before the base station has a use right of the activated secondary component carrier, the base station sends a second activation command to the user equipment.

Step 1006: After receiving the second activation command sent by the base station, the user equipment detects a PDCCH related to the activated secondary component carrier and reports related information.

Step 1007: After receiving the second activation command sent by the base station, the user equipment receives downlink data sent by the base station by using the activated secondary component carrier.

Step 1008: When losing the use right of the activated secondary component carrier or before losing the use right of the activated secondary component carrier, the base station sends a second deactivation command to the user equipment.

Step 1009: After receiving the second deactivation command sent by the base station, the user equipment stops detecting the PDCCH related to the activated secondary component carrier and reporting the related information.

Further, in this embodiment of the present invention, the user equipment may further be controlled by determining whether a deactivation timer on a user equipment side expires, which is specifically as follows:

In step 1007, the user equipment repeatedly receives the downlink data sent by the base station, and the user equipment restarts the deactivation timer each time the downlink data is received; if the deactivation timer does not expire, after the user equipment receives the second deactivation command sent by the base station, the user equipment suspends the deactivation timer; before the user equipment receives the second deactivation command sent by the base station, if the deactivation timer expires, the user equipment deactivates the activated secondary component carrier, stops detecting the PDCCH related to the activated secondary component carrier and reporting the related information, and disables the RF module.

Figure 11:
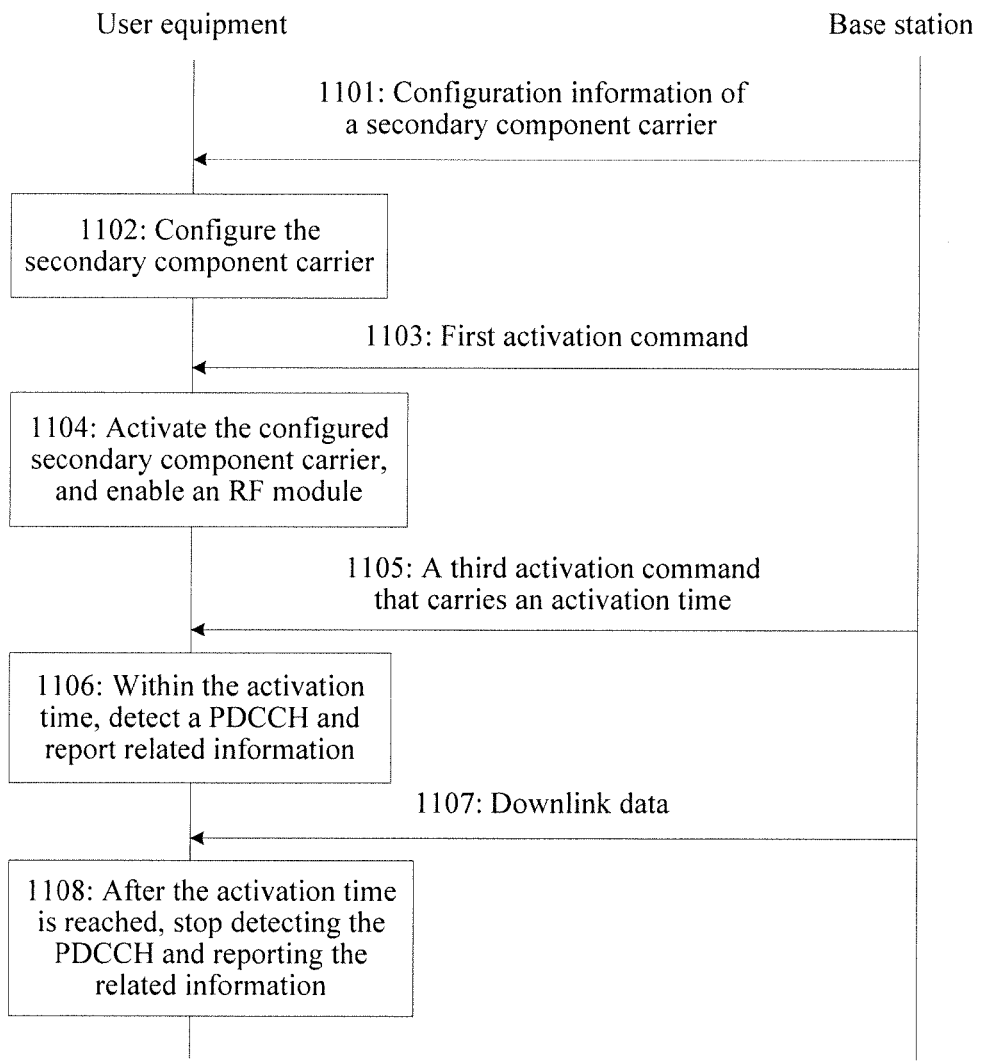
FIG. 11 is another signaling interworking diagram of a carrier using method according to an embodiment of the present invention.

Second: In this embodiment, the permission control information is a third activation command that carries an activation time. Referring to FIG. 11, FIG. 11 is another signaling interworking diagram of a carrier using method according to an embodiment of the present invention, and the method specifically includes:

Step 1101: A base station sends configuration information of a secondary component carrier to user equipment, where the secondary component carrier is a carrier resource in an unlicensed frequency band or a shared frequency band, and the shared frequency band is a frequency band granted to at least two operators for sharing.

Step 1102: The user equipment configures the secondary component carrier according to the configuration information.

Step 1103: The base station sends a first activation command to the user equipment.

Step 1104: The user equipment activates the configured secondary component carrier to obtain an activated secondary component carrier, and controls to enable a radio frequency RF module of the user equipment.

Step 1105: When the base station has a use right of the activated secondary component carrier or before the base station has a use right of the activated secondary component carrier, the base station sends, to the user equipment, the third activation command that carries the activation time.

Step 1106: After receiving the third activation command, the user equipment detects a PDCCH related to the activated secondary component carrier and reports related information within the activation time.

Step 1107: Within the activation time, the user equipment receives downlink data sent by the base station by using the activated secondary component carrier.

Step 1108: After the activation time is reached, the user equipment stops detecting the PDCCH related to the activated secondary component carrier and reporting the related information.

Further, in this embodiment of the present invention, the user equipment may further be controlled by determining whether a deactivation timer on a user equipment side expires, which is specifically as follows:

In step 1107, the user equipment repeatedly receives the downlink data sent by the base station, and the user equipment restarts the deactivation timer each time the downlink data is received; if the deactivation timer does not expire, when the activation time is reached, the user equipment suspends the deactivation timer; before the activation time is reached, if the deactivation timer expires, the user equipment deactivates the activated secondary component carrier, stops detecting the PDCCH related to the activated secondary component carrier and reporting the related information, and disables the RF module.

Figure 12:
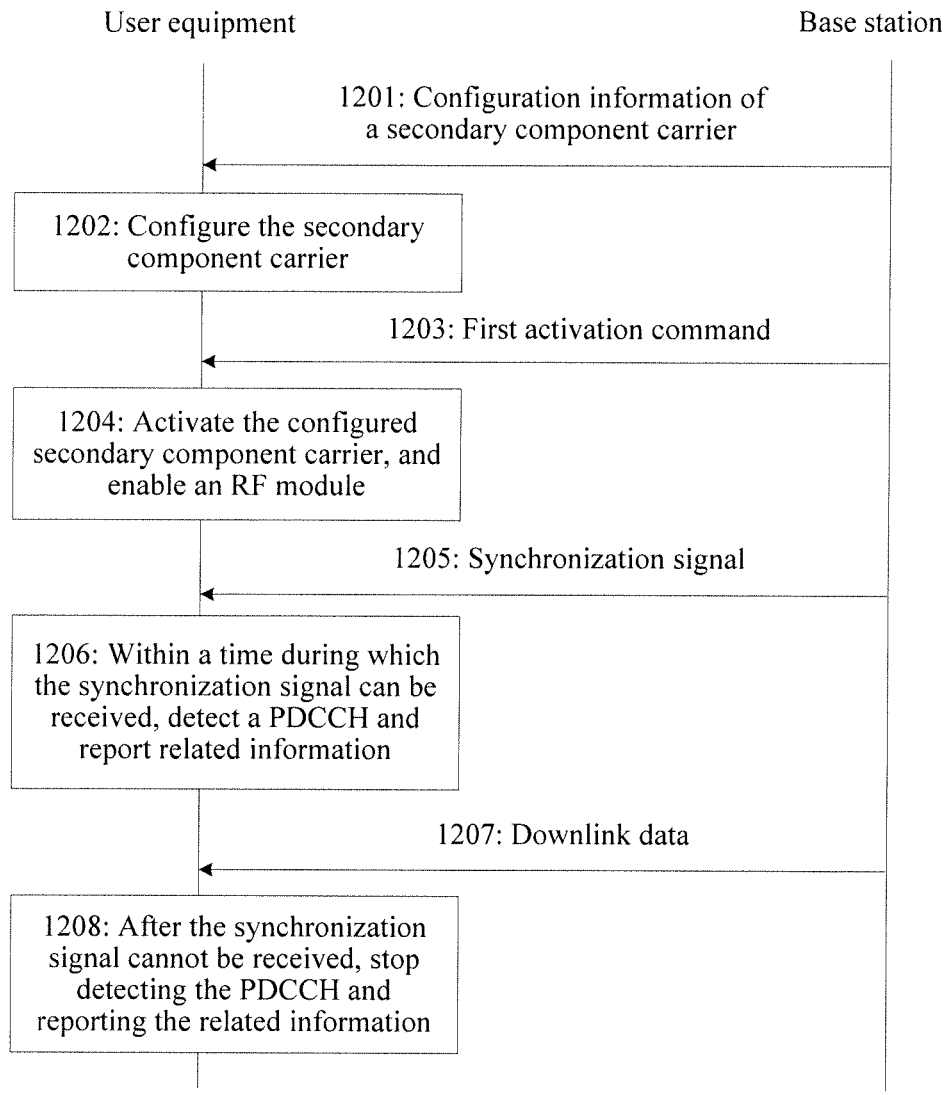
FIG. 12 is another signaling interworking diagram of a carrier using method according to an embodiment of the present invention.

Third: In this embodiment, the permission control information is a synchronization signal. Referring to FIG. 12, FIG. 12 is another signaling interworking diagram of a carrier using method according to an embodiment of the present invention, and the method specifically includes:

Step 1201: A base station sends configuration information of a secondary component carrier to user equipment, where the secondary component carrier is a carrier resource in an unlicensed frequency band or a shared frequency band, and the shared frequency band is a frequency band granted to at least two operators for sharing.

Step 1202: The user equipment configures the secondary component carrier according to the configuration information.

Step 1203: The base station sends a first activation command to the user equipment.

Step 1204: The user equipment activates the configured secondary component carrier to obtain an activated secondary component carrier, and controls to enable a radio frequency RF module of the user equipment.

Step 1205: When the base station has a use right of the activated secondary component carrier, the base station sends the synchronization signal to the user equipment at a specified frequency by using the activated secondary component carrier.

Step 1206: Within a period during which the user equipment can receive the synchronization signal, the user equipment detects a PDCCH related to the activated secondary component carrier and reports related information.

Step 1207: Within a period during which the user equipment can receive the synchronization signal, the user equipment receives downlink data sent by the base station by using the activated secondary component carrier.

Step 1208: After the synchronization signal cannot be received, the user equipment stops detecting the PDCCH related to the activated secondary component carrier and reporting the related information.

Further, in this embodiment of the present invention, the user equipment may further be controlled by determining whether a deactivation timer on a user equipment side expires, which is specifically as follows:

In step 1207, the user equipment repeatedly receives the downlink data sent by the base station, and the user equipment restarts the deactivation timer each time the downlink data is received; if the deactivation timer does not expire, when the synchronization signal cannot be received, the user equipment suspends the deactivation timer; within a period during which the user equipment can receive the synchronization signal, if the deactivation timer expires, the user equipment deactivates the activated secondary component carrier, stops detecting the PDCCH related to the activated secondary component carrier and reporting the related information, and disables the RF module.

In the carrier using method provided in this embodiment of the present invention, first, user equipment configures a secondary component carrier in an unlicensed frequency band or a shared frequency band; when a base station needs to perform data transmission by using the configured secondary component carrier, the secondary component carrier configured by the user equipment is first activated and a radio frequency module of the user equipment is enabled; when needing to perform data transmission by using the activated secondary component carrier, the base station delivers use right control information of the activated secondary component carrier, so that the user equipment determines an available time of the activated secondary component carrier according to the use right control information, and the user equipment performs an operation related to the activated secondary component carrier within the available time. It may be learned that in this embodiment of the present invention, data transmission may be further implemented by using the secondary component carrier in the unlicensed frequency band or the shared frequency band, and a requirement of a mobile network operator or a mobile technology for spectrum resources is further met. In addition, based on temporal discontinuity of a use right of the activated secondary component carrier, in this embodiment of the present invention, only when the base station has or is to have the use right of the activated secondary component carrier, the user equipment performs the operation related to the activated secondary component carrier. In this way, the available time of the activated secondary component carrier may be fully used for data scheduling, and not only carrier utilization efficiency is improved, but also unnecessary power consumption and resource consumption are further reduced for the user equipment.

It may be clearly understood by persons skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a corresponding process in the foregoing method embodiment, refer to a specific working process of a system, an apparatus, and a module described above, and details are not described herein.

In the several embodiments provided in the present application, it should be understood that the disclosed system, apparatus, and method may be implemented in other manners. For example, the described apparatus embodiment is merely exemplary. For example, the module or sub-module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all of the modules may be selected according to actual requirements to achieve the objectives of the solutions of the embodiments.

In addition, functional modules in the embodiments of the present application may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions of the present application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor (processor) to perform all or some of the steps of the methods described in the embodiments of the present application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. User equipment, comprising:
   a receiver, configured to: receive configuration information that is of a secondary component carrier and sent by a base station, wherein the secondary component carrier is a carrier resource in an unlicensed frequency band or a shared frequency band, and the shared frequency band is a frequency band granted to at least two operators for sharing;
   a processor, configured to:
      configure the secondary component carrier according to the configuration information sent by the receiver;
      after the receiver receives a first activation command sent by the base station, activate the secondary component carrier configured by the processor to obtain an activated secondary component carrier, and control to enable a radio frequency (RF) module of the user equipment, wherein the activate the secondary component carrier comprising:
         detecting a physical downlink control channel (PDCCH) related to the activated secondary component carrier, reporting related information, and receiving downlink data sent by the base station by using the activated secondary component carrier, wherein the related information comprises one or more of a channel quality indicator (CQI), a precodinq matrix index (PMI), a rank indicator (RI), and a precodinq type indicator (PTI);
      after the receiver receives the use right control information that is of the activated secondary component carrier and sent by the base station, start a deactivation timer of the user equipment if the deactivation timer is in an unstarted state, so that the deactivation timer counts time according to a preset time length; or if a deactivation timer of the user equipment is in a suspended state, make the deactivation timer continue to count time from a suspended moment according to a preset time length;

restart the deactivation timer each time the second control module receives the downlink data, so that the deactivation timer counts time again according to the preset time length;

if timing by the deactivation timer does not expire and the available time determined by the time determining module ends, suspend the deactivation timer; or if timing by the deactivation timer expires, deactivate the activated secondary component carrier, stop performing the operation related to the activated secondary component carrier, and disable the RF module;

the receiver, is further configured to: receive use right control information that is of the activated secondary component carrier and sent by the base station; and the processor is further configured to: determine an available time of the activated secondary component carrier according to the use right control information.

2. The user equipment according to claim 1, wherein:

the receiver is further configured to receive a second activation command and a second deactivation command sent by the base station in sequence; and the processor is further configured to determine an interval time between receiving the second activation command and receiving the second deactivation command by the receiver as the available time of the activated secondary component carrier.

3. The user equipment according to claim 1, wherein:

the receiver is further configured to receive a synchronization signal sent by the base station at a specified frequency by using the activated secondary component carrier; and the processor is further configured to determine a period during which the receiver can receive the synchronization signal as the available time of the activated secondary component carrier.

4. The user equipment according to claim 1, wherein the processor is further configured to:

after the receiver receives a first deactivation command sent by the base station, deactivate the activated secondary component carrier, stop performing the operation related to the activated secondary component carrier, and disable the RF module.

5. A carrier using method, comprising:

receiving, by user equipment, configuration information that is of a secondary component carrier and sent by a base station, and configuring the secondary component carrier according to the configuration information, wherein the secondary component carrier is a carrier resource in an unlicensed frequency band or a shared frequency band, and the shared frequency band is a frequency band granted to at least two operators for sharing;

after receiving a first activation command sent by the base station, activating the configured secondary component carrier to obtain an activated secondary component carrier, and controlling to enable a radio frequency (RF) module of the user equipment, wherein the activating the configured secondary component carrier comprising:

detecting a physical downlink control channel (PDCCH) related to the activated secondary component carrier, reporting related information, and receiving downlink data sent by the base station by using the activated secondary component carrier, wherein the related information comprises one or more of a channel quality indicator (CQI), a precodinq matrix index (PMI), a rank indicator (RI), and a precodinq type indicator (PTI);

after receiving the use right control information that is of the activated secondary component carrier and sent by the base station, starting a deactivation timer of the user equipment if the deactivation timer is in an unstarted state, so that the deactivation timer counts time according to a preset time length; or if a deactivation timer of the user equipment is in a suspended state, making the deactivation timer continue to count time from a suspended moment according to a preset time length;

restarting the deactivation timer each time the downlink data is received, so that the deactivation timer counts time again according to the preset time length; and if timing by the deactivation timer does not expire and the available time is reached, suspending the deactivation timer; or if timing by the deactivation timer expires, deactivating the activated secondary component carrier, stopping performing the operation related to the activated secondary component carrier, and disabling the RF module;

receiving use right control information that is of the activated secondary component carrier and sent by the base station; and determining an available time of the activated secondary component carrier according to the use right control information.

6. The method according to claim 5, wherein the receiving use right control information that is of the activated secondary component carrier and sent by the base station, and determining an available time of the activated secondary component carrier according to the use right control information comprises:

receiving a second activation command and a second deactivation command sent by the base station in sequence; and determining an interval time between receiving the second activation command and receiving the second deactivation command as the available time of the activated secondary component carrier.

7. The method according to claim 5, wherein the receiving use right control information that is of the activated secondary component carrier and sent by the base station, and determining an available time of the activated secondary component carrier according to the use right control information comprises:

receiving a synchronization signal sent by the base station at a specified frequency by using the activated secondary component carrier; and determining a period during which the synchronization signal can be received as the available time of the activated secondary component carrier.

8. The method according to claim 5, wherein the method further comprises:

after receiving a first deactivation command sent by the base station, deactivating the activated secondary component carrier, stopping performing the operation related to the activated secondary component carrier, and disabling the RF module.

9. A non-transitory computer-readable medium storing instructions which when executed by a processor cause the processor to execute a carrier using method, comprising:
  receiving, by user equipment, configuration information that is of a secondary component carrier and sent by a base station, and configuring the secondary component carrier according to the configuration information, wherein the secondary component carrier is a carrier resource in an unlicensed frequency band or a shared frequency band, and the shared frequency band is a frequency band granted to at least two operators for sharing;
  after receiving a first activation command sent by the base station, activating the configured secondary component carrier to obtain an activated secondary component carrier, and controlling to enable a radio frequency (RF) module of the user equipment, wherein the activating the configured secondary component carrier comprising:
    detecting a physical downlink control channel (PDCCH) related to the activated secondary component carrier, reporting related information, and receiving downlink data sent by the base station by using the activated secondary component carrier, wherein the related information comprises one or more of a channel quality indicator (CQI), a precoding matrix index (PMI), a rank indicator (RI), and a precoding type indicator (PTI);
  after receiving the use right control information that is of the activated secondary component carrier and sent by the base station, starting a deactivation timer of the user equipment if the deactivation timer is in an unstarted state, so that the deactivation timer counts time according to a preset time length; or if a deactivation timer of the user equipment is in a suspended state, making the deactivation timer continue to count time from a suspended moment according to a preset time length;
  restarting the deactivation timer each time the downlink data is received, so that the deactivation timer counts time again according to the preset time length; and
  if timing by the deactivation timer does not expire and the available time is reached, suspending the deactivation timer; or
  if timing by the deactivation timer expires, deactivating the activated secondary component carrier, stopping performing the operation related to the activated secondary component carrier, and disabling the RF module;
  receiving use right control information that is of the activated secondary component carrier and sent by the base station; and
  determining an available time of the activated secondary component carrier according to the use right control information.

10. The non-transitory computer-readable medium according to claim 9, wherein the receiving use right control information that is of the activated secondary component carrier and sent by the base station, and determining an available time of the activated secondary component carrier according to the use right control information comprises:
  receiving a second activation command and a second deactivation command sent by the base station in sequence; and
  determining an interval time between receiving the second activation command and receiving the second deactivation command as the available time of the activated secondary component carrier.

11. The non-transitory computer-readable medium according to claim 9, wherein the receiving use right control information that is of the activated secondary component carrier and sent by the base station, and determining an available time of the activated secondary component carrier according to the use right control information comprises:
  receiving a synchronization signal sent by the base station at a specified frequency by using the activated secondary component carrier; and
  determining a period during which the synchronization signal can be received as the available time of the activated secondary component carrier.

12. The non-transitory computer-readable medium according to claim 9, wherein the method further comprises:
  after receiving a first deactivation command sent by the base station, deactivating the activated secondary component carrier, stopping performing the operation related to the activated secondary component carrier, and disabling the RF module.

13. The user equipment according to claim 1, wherein:
  the receiver is further configured to receive a third activation command that carries an activation time and that is sent by the base station; and
  the processor is further configured to determine the activation time as the available time of the activated secondary component carrier.

14. The method according to claim 5, wherein the receiving use right control information that is of the activated secondary component carrier and sent by the base station, and determining an available time of the activated secondary component carrier according to the use right control information comprises:
  receiving a third activation command that carries an activation time and that is sent by the base station; and
  determining the activation time as the available time of the activated secondary component carrier.

15. The non-transitory computer-readable medium according to claim 9, wherein the receiving use right control information that is of the activated secondary component carrier and sent by the base station, and determining an available time of the activated secondary component carrier according to the use right control information comprises:
  receiving a third activation command that carries an activation time and that is sent by the base station; and
  determining the activation time as the available time of the activated secondary component carrier.

* * * * *

UNITED STATES PATENT AND TRADEMARK OFFICE
CERTIFICATE OF CORRECTION

PATENT NO. : 10,034,177 B2
APPLICATION NO. : 15/265034
DATED : July 24, 2018
INVENTOR(S) : Zhenzhen Cao et al.

It is certified that error appears in the above-identified patent and that said Letters Patent is hereby corrected as shown below:

In the Claims

Column 24, Line 61:
In Claim 1, delete "precodinq", and insert -- precoding --, therefore.

Column 24, Line 62:
In Claim 1, delete "precodinq", and insert -- precoding --, therefore.

Column 26, Line 5:
In Claim 5, delete "precodinq", and insert -- precoding --, therefore.

Column 26, Line 6:
In Claim 5, delete "precodinq", and insert -- precoding --, therefore.

Signed and Sealed this
Fifth Day of February, 2019

Andrei Iancu
*Director of the United States Patent and Trademark Office*